United States Patent
Morris et al.

(10) Patent No.: US 6,861,115 B2
(45) Date of Patent: Mar. 1, 2005

(54) INK JET RECORDING MEDIUM COMPRISING AMINE-TREATED SILICA

(75) Inventors: Michael D. Morris, Nashua, NH (US); Michael S. Darsillo, Clifton Park, NY (US); David J. Fluck, Bel Aire, MD (US); Jason R. Hilton, Charleston, IL (US); Rudiger Laufhutte, Champaign, IL (US); Michael A. Lucarelli, McMurray, PA (US)

(73) Assignee: Cabot Corporation, Boston, MA (US)

( * ) Notice: Subject to any disclaimer, the term of this patent is extended or adjusted under 35 U.S.C. 154(b) by 9 days.

(21) Appl. No.: 09/860,279

(22) Filed: May 18, 2001

(65) Prior Publication Data

US 2002/0182377 A1 Dec. 5, 2002

(51) Int. Cl.$^7$ ................................................. B41M 5/40
(52) U.S. Cl. .................. 428/32.36; 428/32.34
(58) Field of Search .................... 428/32.34, 32.36, 428/195, 323, 331; 327/105, 106

(56) References Cited

U.S. PATENT DOCUMENTS

| | | |
|---|---|---|
| RE30,450 E | 12/1980 | Iannicelli |
| 4,343,857 A | 8/1982 | Uram, Jr. |
| 4,522,958 A | 6/1985 | Das et al. |
| 4,618,556 A | 10/1986 | Takenouchi |
| 4,640,882 A | 2/1987 | Mitsuhashi et al. |
| 4,654,284 A | 3/1987 | Yu et al. |
| RE32,889 E | 3/1989 | Litke |
| 4,816,366 A | 3/1989 | Hyosu et al. |
| 4,923,520 A | 5/1990 | Anzai et al. |
| 5,169,441 A | 12/1992 | Lauzon |
| 5,246,624 A | 9/1993 | Miller et al. |
| 5,304,243 A | 4/1994 | Yamaguchi et al. |
| 5,378,566 A | 1/1995 | Yu |
| 5,411,787 A | 5/1995 | Kulkarni et al. |
| 5,576,088 A | 11/1996 | Ogawa et al. |
| 5,660,622 A | 8/1997 | Nikoloff |
| 5,665,156 A | 9/1997 | Ettlinger et al. |
| 5,677,067 A * | 10/1997 | Kojima et al. ............ 428/478.2 |
| 5,693,127 A | 12/1997 | Nigam et al. |
| 5,711,797 A | 1/1998 | Ettlinger et al. |
| 5,776,240 A | 7/1998 | Deller et al. |
| 5,851,715 A | 12/1998 | Barthel et al. |
| 5,856,379 A | 1/1999 | Shiratsuchi et al. |
| 6,001,163 A | 12/1999 | Havey et al. |
| 6,004,899 A | 12/1999 | Tachizawa |
| 6,096,469 A | 8/2000 | Anderson et al. |
| 6,129,785 A | 10/2000 | Schliesman et al. |
| 6,228,475 B1 | 5/2001 | Chu et al. |
| 6,284,819 B1 * | 9/2001 | Darsillo et al. ............... 542/22 |
| 6,365,264 B2 | 4/2002 | Darsillo et al. |
| 6,380,266 B1 | 4/2002 | Katz et al. |
| 6,478,861 B1 | 11/2002 | Kwan et al. |
| 2001/0014381 A1 | 8/2001 | Kaneko et al. |
| 2001/0016249 A1 | 8/2001 | Kitamura et al. |
| 2002/0040661 A1 | 4/2002 | Glaum et al. |

FOREIGN PATENT DOCUMENTS

| | | |
|---|---|---|
| EP | 0 220 841 A2 | 5/1987 |
| EP | 0 732 219 A2 | 9/1996 |
| EP | 983 867 A2 | 3/2000 |
| EP | 0 983 867 A2 | 3/2000 |
| JP | 59 192589 A | 10/1984 |
| JP | 60-224580 A | 11/1985 |
| JP | 62 178384 A | 8/1987 |
| JP | 1-019353 B2 | 4/1989 |
| JP | 3-24905 B2 | 4/1991 |
| JP | 11-165459 A | 5/1999 |
| JP | 2001-010202 A | 1/2001 |
| WO | WO 00/01539 A1 | 1/2000 |
| WO | WO 01/05599 A1 | 1/2001 |

OTHER PUBLICATIONS

Lewis, ed. *Pigment Handbook*, p. 166, John Wiley & Sons, New York, 1988.

Degussa Product Information, "Experimental Product: Aerosil®R504, Aerosil 200 Aftertreated with Triethoxy–Propyl–Amino–Silane and Hexamethyl–Di–Silazane"(1996).

Degussa Product Brochure, Aerosil® Fumed Silica, pp. 1–32.

Degussa Product Brochure, Precipitated Silicas.

Degussa Technical Library, GP–126, "Degussa Synthetic Amorphous Silicas for Ink Jet Surfaces".

Witham, Michael C., "Silica Pigment Porosity Effects on Color Ink Jet Printablility," IS&T's NIP12: International Conference on Digital Printing Technologies, pp. 409–417.

* cited by examiner

Primary Examiner—B. Shewareged

(57) ABSTRACT

This invention pertains to an ink jet recording medium comprises a flexible substrate and a coating composition coated on at least one surface of the substrate, wherein the coating composition comprises the product formed from the contact between fumed silica particles and at least one aminoorganosiloxane. The invention also pertains to a method for the preparation of such an ink jet recording medium and to methods for the preparation of a coating composition and a dispersion useful in the preparation of such an ink jet recording medium.

28 Claims, No Drawings

INK JET RECORDING MEDIUM COMPRISING AMINE-TREATED SILICA

FIELD OF THE INVENTION

This invention pertains to an ink jet recording medium comprising a flexible substrate and a coating composition. This invention also pertains to a method for the preparation of an ink jet recording medium and to methods for the preparation of a coating composition and a dispersion useful in the preparation of an ink jet recording medium.

BACKGROUND OF THE INVENTION

To improve the printing properties of a recording medium, a coating composition is sometimes applied to its surface to form a coating thereon. For example, a coating can impart a superior feel and a photograph-like quality to a printed image; a highly absorptive coating can reduce the smearing and rub off of an image, and a coating that immobilizes (i.e., adsorbs) colorants at the outer surface of the coating can enhance the waterfastness, sharpness, resolution and color density of a printed image.

Coating compositions as described above can be applied to various types of recording media, including those used in ink jet and laser printing processes. In a typical ink jet printing process, a print head scans the recording medium in horizontal strips, using a motor assembly to move it from left to right, as another motor assembly rolls the recording medium vertically through the ink jet printer. As the recording medium is fed vertically through the ink jet printer, ink is emitted from nozzles in vertical rows of pixels to eventually form an image. This differs from, for example, a laser printing process where an image is printed (or copied) onto a recording medium by depositing a uniform electric charge on a photoconductor drum in the dark; exposing the drum to a pattern of light, thereby creating a latent image area; developing the pattern by adding toner particles to the latent image area; transferring toner particles to the recording medium as it is passed over the drum; fusing the toner particles to the recording medium by applying heat and pressure thereto; and cleaning the photoconductor drum.

There are several advantages of using an ink jet printing process as compared to a laser printing (or copying) process. Indeed, ink jet printing can be done with less expensive hardware and can be used with a variety of different substrates. As a result, the demand for improved ink jet recording media has grown, particularly recording media exhibiting the characteristics described above.

It is a challenge, however, to prepare an ink jet recording medium having a coating that is at once glossy, absorptive, and immobilizing. Gloss and colorant immobilization can sometimes be achieved by incorporating different types of polymeric resins into a coating composition. For example, gelatin, polyvinyl pyrrolidone and/or polyvinyl alcohol can be used to produce glossiness, while a cationic polymer resin can be used to promote the surface immobilization of an anionic colorant. However, inks applied to polymer-coated ink jet recording media dry relatively slowly, and often have an undesirable tendency to smear and rub off. While some substances such as certain treated kaolin clays or treated calcium carbonates can immobilize colorants, the overall absorptivity and rate of absorption are sometimes compromised with such substances.

Thus, a need remains for an ink jet recording medium having a coating that is at once glossy, absorptive, and immobilizing. The present invention seeks to provide such a recording medium. These and other advantages of the invention will be apparent from the description of the invention provided herein.

BRIEF SUMMARY OF THE INVENTION

The invention provides an ink jet recording medium comprising a flexible substrate and a coating composition coated on at least one surface of the substrate, wherein the coating composition comprises the product formed from the contact between fumed silica particles and at least one aminoorganosiloxane. The invention also provides a method for the preparation of an ink jet recording medium.

Furthermore, the invention provides a coating composition for ink jet recording media, the composition comprising an aqueous vehicle, at least one binder, and the product formed from the contact between fumed silica particles and at least one aminoorganosiloxane. The invention also provides a method for the preparation of a coating composition and a method for the preparation of a dispersion useful in the preparation of an ink jet recording medium.

DETAILED DESCRIPTION OF THE INVENTION

This invention pertains to an ink jet recording medium comprising a flexible substrate and a coating composition. The invention also pertains to a method for the preparation of an ink jet recording medium and to methods for the preparation of a coating composition and a dispersion useful in the preparation of an ink jet recording medium.

The ink jet recording medium comprises a flexible substrate and a coating composition coated on at least one surface of the substrate, wherein the coating composition comprises the product formed from the contact between fumed silica particles and at least one aminoorganosiloxane. The ink jet recording medium can be prepared utilizing a method comprising coating at least a portion of the surface of a flexible substrate with the product formed from the contact between fumed silica particles and at least one aminoorganosiloxane to provide a coated substrate, and drying the coated substrate to produce an ink jet recording medium.

In addition, the invention provides a coating composition for ink jet recording media, the composition comprising an aqueous vehicle, at least one binder, and the product formed from the contact between fumed silica particles and at least one aminoorganosiloxane. The coating composition can be prepared utilizing a method comprising combining a dispersion of (a) the product formed from the contact between fumed silica particles and at least one aminoorganosiloxane with (b) at least one binder to produce the coating composition.

Furthermore, the invention provides a method for the preparation of a dispersion useful in preparing an ink jet recording medium, comprising (a) mixing fumed silica particles with an aqueous vehicle under high shear conditions to form a mixture of fumed silica, such that the mixture does not coagulate and (b) adding at least one aminoorganosiloxane to the mixture of (a), so as to form a dispersion of the product formed from the contact between the fumed silica particles and the at least one aminoorganosiloxane.

The fumed silica used in conjunction with the invention enhances the ability of the coated flexible substrate to immobilize (i.e., adsorb) and display colorants at the surface of the substrate. The term "colorant" as used herein is meant to encompass both dyes and pigments. In effect, the fumed silica enhances the ability of the coated flexible substrate to immobilize both water-soluble and water insoluble compounds at the surface of the substrate. The fumed silica comprises fumed silica particles that have been contacted with at least one aminoorganosiloxane. Any suitable aminoorganosiloxane can be used in conjunction with the invention. Suitable aminoorganosiloxanes include, for example, aminoorganosiloxanes of the formula $(R^1O)_nSi(R^2)_m$, wherein $R^1$ is H, a $C_1$–$C_{10}$ alkyl, or a metal ion; $R^2$ is an aryl, a $C_1$–$C_{10}$ alkyl, or an aralkyl, wherein the aryl, alkyl, and aralkyl are substituted with one or more substituents selected from the group consisting of amines and quaternary ammonium salts; and n and m are each integers equal to or greater than 1, wherein the sum of n and m is 4. Desirably, n is 3 and m is 1, and $R^2$ is an alkyl substituted with one or more substituents selected from the group consisting of amines and quaternary ammonium salts. Therefore, the aminoorganosiloxane used in conjunction with the invention is desirably of the formula (I):

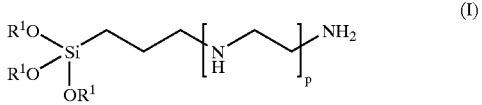

wherein p is an integer from zero to about 100. Preferably, p is an integer from zero to about 50, and more preferably from zero to about 25 (e.g., from zero to about 10, and most preferably either zero or 1). In addition to these preferences, it is desirable for $R^1$ to be H, methyl, or ethyl, and $R^2$ to be substituted with a polyamine. A preferred polyamine is poly(ethyleneimine) or derivatives thereof. In accordance with these preferences, specific aminoorganosiloxanes that are most preferred include 3-aminopropyltrimethoxysilane, N-(2-aminoethyl)-3-aminopropyltrimethoxysilane (3-triethoxysilylpropyl)-diethylenetriamine, 3-aminopropyltriethoxysilane, N-(2-aminoethyl)-3-aminopropyltriethoxysilane, (3-triethoxysilylpropyl)-diethylenetriamine, and mixtures thereof.

Advantageously, the ink jet recording medium described herein does not require the ink jet recording medium to contain thermal imaging chemicals. Typically, recording media utilized in applications such as electrophotographic imaging, xerographic imaging, and the like require a heat-sensitive fusible layer containing these thermal imaging chemicals, which are mainly composed of a normally electron donating colorless or slightly colored dye precursor and an electron accepting color developer. The dye precursor and the color developer instantaneously react upon application of heat, such as by a thermal head, thermal pen, laser beam, or the like to form an image. For purposes of the invention, it is suitable for the ink jet recording medium of the invention to be substantially devoid of thermal imaging chemicals. By substantially devoid is meant that the ink jet recording medium of the invention comprises less than about 0.001 wt. % of thermal imaging chemicals. It is also suitable for the ink jet recording medium of the invention to be completely devoid of thermal imaging chemicals. By completely devoid is meant that the ink jet recording medium contains no thermal imaging chemicals. In certain embodiments, however, such as when an ink jet printer uses heat and/or pressure to form an image, it is suitable for the ink jet recording medium to contain thermal imaging chemicals in an amount such that an image can be successful formed on the ink jet recording medium.

The fumed silica utilized in the invention can be any suitable fumed silica and typically will be in the form of particles that are aggregates of smaller, primary particles. Although the primary particles are not porous, the aggregates contain a significant void volume and are capable of rapidly absorbing liquid. These void-containing aggregates enable a coating of such aggregates to retain a significant capacity for liquid absorption even when the aggregate particles are densely packed, which minimizes the inter-particle void volume of the coating.

The fumed silica particles used in conjunction with the invention can be of any suitable size. Generally, the fumed silica particles have a mean diameter of at least about 100 nm (e.g., particles having a mean diameter of about 100 nm–1 µm, more preferably about 100–500 nm, most preferably about 100–400 nm, and especially about 150–250 nm). The fumed silica can comprise fumed silica particles having any suitable range of individual particle diameters, such as a relatively broad range or a relatively narrow range. Preferably, all or substantially all of the fumed silica particles have diameters of at least about 30 nm (e.g., all or substantially all of the particles have diameters of about 30 nm–1µm). The particles also can be monodispersed. By monodispersed is meant that the individual particles have diameters that are substantially identical. For example, substantially all monodispersed 200 nm particles have diameters in the range of about 190–210 nm.

It should be noted that the diameter values set forth above for the fumed silica particles refer to the diameters of the aggregates. With respect to the primary particles that make up these silica aggregates, it is preferred that the primary particles have a mean diameter of less than about 100 nm (e.g., about 1–100 nm). More preferably, the primary particles have a mean diameter of less than about 50 nm (e.g., about 1–50 nm), even more preferably less than about 30 nm (e.g., about 1–30 nm), and most preferably less than about 20 nm (e.g., about 5–15 nm). In addition, all or substantially all of the primary particles can have diameters smaller than the mean diameter values set forth above. In other words, it is preferred that all or substantially all of the primary particles have diameters of less than about 100 nm (e.g., about 1–100 nm), more preferred that all or substantially all of the primary particles have diameters of less than about 50 nm (e.g., about 1–50 nm), even more preferred that all or substantially all of the primary particles have diameters of less than about 30 mn (e.g., about 1–30 nm), and most preferred that all or substantially all of the primary particles have diameters of less than about 20 nm (e.g., about 5–15 mn).

Moreover, the fumed silica can have any suitable surface area. Generally a surface area of about 20–400 m²/g is suitable for the fumed silica. Preferably, the fumed silica has a surface area of about 50–400 m²/g, and, more preferably, the fumed silica has a surface area of about 90–330 m²/g. The surface area of the fumed silica can be measured by any suitable method known in the art. Typically, the surface area of the fumed silica is determined by the method of S. Brunauer, P. H. Emmet, and I. Teller, *J. Am. Chemical Society*, 60, 309 (1938), which is commonly referred to as the BET method.

The invention involves the use of the product formed from the contact between the fumed silica particles and at least one aminoorganosiloxane. The contact between the fumed silica particles and at least one aminoorganosiloxane can be achieved by any suitable means. For example, an aminoorganosiloxane can be sprayed and optionally heat-treated onto fumed silica particles before being mixed with an aqueous vehicle. It is preferred, however, that the contact between the fumed silica particles and at least one aminoorganosiloxane comprises adding at least one aminoorganosiloxane to the fumed silica particles in a suitable vehicle (e.g., water). The fumed silica particles also can be contacted with at least one aminoorganosiloxane in a suitable solvent (e.g., water). For example, a solution of an aminoorganosiloxane in water can be added to an aqueous mixture of fumed silica particles.

The product formed from the contact between the fumed silica particles and the at least one aminoorganosiloxane desirably is in the form of a dispersion in a suitable vehicle (for example, a liquid carrier such as water) for subsequent use in preparing the ink jet recording medium. The product particles preferably are stably suspended in the vehicle such that the product particles do not settle to the bottom of a container of the dispersion for at least about 24 hours when the dispersion is allowed to stand (i.e., without stirring or other agitation) at a temperature of about 25° C. following its preparation.

The dispersion of the product can be prepared by any suitable method. Preferably, the dispersion is prepared by a method comprising (a) mixing fumed silica particles with an aqueous vehicle under high shear conditions to form a mixture of fumed silica, such that the mixture does not coagulate, and (b) adding at least one aminoorganosiloxane to the mixture of (a), so as to form a dispersion of the product formed from the contact between the fumed silica particles and the at least one aminoorganosiloxane. Mixing under high shear conditions provides an even distribution of the components of the dispersion, thereby forming a substantially uniform or homogeneous mixture of the components. Mixing under high shear conditions also can improve the rheology of the dispersion and can increase the strength and uniformity of any final article prepared from the dispersion. High shear mixers are described in U.S. Pat. Nos. 4,225,247, 4,552,463, 4,889,428, 4,944,595, and 5,061,319.

A dispersion of the product formed from the contact between the fumed silica particles and the at least one aminoorganosiloxane should be relatively stable (i.e., slow to coagulate). The stability of the dispersion can be determined by measuring the viscosity of the dispersion after it is suitably prepared and then allowed to stand undisturbed (i.e., without stirring or any other agitation) for a certain length of time. The viscosity can be measured, for example, using a Brookfield LVT viscometer (spindle no. 5, 60 rpm, two minute spin at 25° C.). Alternatively, the viscosity may be measured pursuant to ASTM D 2196 (06.01) entitled "Rheological Properties of Non-Newtonian Materials by Rotational (Brookfield) Viscometer." It is preferred that the viscosity of the dispersion increases by less than about 50% when the dispersion is allowed to stand at a temperature of about 25° C. for 60 days, 90 days, 180 days, and/or 270 days immediately following the preparation thereof.

The aqueous vehicle of the dispersion can be any suitable aqueous vehicle (e.g., carrier). The vehicle of the dispersion preferably comprises, consists essentially of, or even consists of water, more preferably deionized water. The vehicle of the dispersion also can comprise any number of suitable water-miscible liquids, such as one or more water-miscible alcohols (e.g., methanol, ethanol, etc.) or ketones (e.g., acetone) in addition to water.

The dispersion comprises fumed silica in an amount of about 5–50% by weight (e.g., about 10–30% by weight). For some end uses, the dispersion preferably has a fumed silica content of at least about 10% by weight (e.g., about 10–50% by weight), more preferably at least about 20% by weight (e.g., about 20%–50% by weight), and most preferably at least about 30% by weight (e.g., about 30–50% by weight). For other end uses, such as when a dispersion of maximum stability is desired, the dispersion preferably comprises less than about 35% by weight of fumed silica (e.g., about 5–35% by weight), more preferably less than about 25% by weight (e.g., about 5–25% by weight), and most preferably less than about 15% by weight (e.g., about 5–15% by weight).

For many end uses, it is desirable for the dispersion to be of high purity. Any suitable technique can be employed for that purpose. One method for increasing purity is to pass the dispersion through a filter (e.g., filtering the dispersion) to remove grit and other impurities and/or to remove particles above a certain size. For example, the dispersion can be filtered such that particles having a diameter of about 1 $\mu$m or more are filtered out of the dispersion. In order for a dispersion to be filterable, the viscosity of the dispersion must be low enough such that the dispersion is able to efficiently pass through the desired filter. The finer the filter (i.e., the smaller the size of the pores of the filter), the lower the viscosity of the dispersion must be for the dispersion to efficiently pass through the filter. As will be appreciated by those of ordinary skill in the art, the dispersion should be passed through as fine a filter as possible to achieve as high a degree of purity as possible but without significantly removing the desirable fumed silica particles. Thus, it is generally advantageous to produce a dispersion with a relatively low viscosity, such as described herein, such that the dispersion can be filtered with a suitably fine filter if desired.

While the inventors do not wish to be bound by any particular theory, it is believed that contacting a fumed silica particle with at least one aminoorganosiloxane as described herein causes an aminoorganosiloxane to bind to or to otherwise become associated with the surface of the fumed silica particle, possibly covalently or through an electrostatic interaction. In other words, the interaction of fumed silica particles with an aminoorganosiloxane causes the surface of the fumed silica particles to become cationically charged. Colorants (i.e., dyes and pigments), such as those used in ink jet inks, often contain ionizable functional groups (e.g., $SO_3H$, $COOH$, $PO_3H_2$, etc.), which increase the water solubility of the dyes or dispersibility of the pigments. The colorants become negatively charged when these functional groups ionize in water (e.g., to $SO_3^-$, $COO^-$, $PO_3^{2-}$, etc.), and as a result experience strong electrostatic attraction to the positive charge of the fumed silica. Therefore, even though the ink can be rapidly absorbed into the coating via the pores of the fumed silica, the anionic colorants can be separated from the ink, and immobilized near the coating surface.

The net charge on the fumed silica particles can be qualitatively determined by measuring the zeta potential of the dispersion (e.g., using a Matec MBS 8000 instrument or a Brookhaven Zeta Plus instrument). The magnitude of the zeta potential is proportional to the magnitude of the charge. In addition, negative zeta potential is indicative of a net negative charge on the fumed silica particles, while a positive zeta potential indicates a net positive charge on the fumed silica particles. The dispersion of the product formed from the contact between the fumed silica particles and the at least one aminoorganosiloxane, therefore, desirably exhibits a positive zeta potential.

The relative ratio of the total amount of aminoorganosiloxane(s) to the total amount of fumed silica must be high enough so that a sufficient amount of the fumed silica particles contact the aminoorganosiloxane(s). Desirably, the fumed silica particles are contacted with at least one aminoorganosiloxane in an amount of about 0.01–5% by weight of the fumed silica. It is preferred, however, that the fumed silica particles are contacted with at least one aminoorganosiloxane in an amount of about 0.05–3% by weight, and most preferably in an amount of about 1–3% by weight, of the fumed silica.

Any suitable flexible substrate can be used in conjunction with the invention. By any suitable flexible substrate is meant that the substrate is characterized by properties, which allow it to be used effectively in an ink jet printing process. Non-flexible substrates, such as those used in conjunction with a xerographic or laser printing processes (e.g., a photoconductor drum), do not exhibit properties which allow them to be used effectively in an ink jet printing process. Moreover, the flexible substrate can be transparent or opaque and can comprise any suitable material (such as a polymer). Examples of such materials include, but are not limited to, polyesters (e.g., poly(ethylene terephthalate)), diacetate resins, triacetate resins, acrylic resins, polycarbonate resins, polyvinyl chloride resins, polyimide resins, cellophane and celluloid, glass sheets, metal sheets, plastic sheets, paper (e.g., cellulose or synthetic paper), photo-base material (e.g., paper coated with polyethylene or baryte), pigment-containing opaque films, and foamed films. Preferably, the flexible substrate comprises a polymer film, cellulose paper, or a photo-base material. When the flexible substrate comprises a polymer film, the polymer film is preferably selected from the group consisting of poly (ethylene terephthalate), polyvinyl chloride, or mixtures thereof. When the flexible substrate comprises a paper, the paper is preferably cellulose paper, and when the flexible substrate comprises a photo-base material, preferably the photo-base material is coated with at least one coating selected from the group consisting of polyethylene, baryte, and mixtures thereof.

The ink jet recording medium can comprise a flexible substrate having more than one layer of coating, which can be the same or different. However, at least one of the coating layers comprises the product formed from the contact between fumed silica particles and at least one aminoorganosiloxane. For example, the ink jet recording medium of the invention can comprise a flexible substrate coated with one or more ink-receptive layers (e.g., comprising the coating composition described herein) and/or one or more resinous layers (e.g., a glossy, laminated surface layer). Even though the ink jet recording medium of the invention can comprise such additional layers of coating, it has been found that the coating composition of the invention imparts to a substrate sufficient ink absorption, colorant immobilization, and gloss characteristics for the vast majority of printing applications.

The ink jet recording medium of the invention can be prepared by coating at least a portion of the surface of a flexible substrate by any suitable means with the product formed from the contact between fumed silica particles and at least one aminoorganosiloxane to provide a coated substrate, and drying the coated substrate by any suitable means to produce the recording medium. The product formed from the contact between fumed silica particles and at least one aminoorganosiloxane usually will be part of a coating composition.

The coating composition of the invention comprises an aqueous vehicle, at least one binder, and the product formed from the contact between fumed silica particles and at least one aminoorganosiloxane. Preferred binders include, but are not limited to, polyvinyl alcohol, polyvinyl acetate, polyvinyl acetal, polyvinyl pyrrolidone, oxidized starch, etherified starch, cellulose derivatives (e.g., carboxymethyl cellulose, hydroxyethyl cellulose, etc.), casein, gelatin, soybean protein, silyl-modified polyvinyl alcohol, conjugated diene copolymer latexes (e.g., maleic anhydride resin, styrene-butadiene copolymer, methyl methacrylate-butadiene copolymers, etc.), acrylic polymer latexes (e.g., polymers and copolymers of acrylic esters and methacrylic esters, polymers and copolymers of acrylic acid and methacrylic acid, etc.), vinyl polymer latexes (e.g., ethylene-vinyl acetate copolymer), functional group-modified polymer latexes obtained by modifying the aforementioned polymers with monomers containing functional groups (e.g., carboxyl groups), aqueous binders such as thermosetting resins (e.g., melamine resin, urea resin, etc.), synthetic resin binders such as polymethyl methacrylate, polyurethane resin, polyester resin (e.g., unsaturated polyester resin), amide resin, vinyl chloride-vinyl acetate copolymer, polyvinyl butyral, and alkyd resin, with polyvinyl alcohol being most preferred. It will be understood that the relative ratio of the total amount of organically treated fumed silica to the total amount of binder(s) will depend on the binder used. For example, the optimum ratio for polyvinyl alcohol will be different from the optimum ratio for polyvinyl pyrrolidone.

The coating composition can be prepared by any suitable method. Preferably, the coating composition is prepared by combining a dispersion of the product formed from the contact between fumed silica particles and at least one aminoorganosiloxane with at least one binder to produce the coating composition. It will be understood that the pH of the coating composition can be adjusted at any stage during its preparation so as to prevent flocculation and/or coagulation of the coating composition or any component used to produce the coating composition (e.g., a dispersion of fumed silica). For example, the pH can be adjusted during the preparation of the dispersion before mixing the dispersion with the at least one binder. It is also suitable for the pH to be adjusted after the dispersion is mixed with the at least one binder (i.e., after forming the coating composition). In any case, it is preferred that the pH at any stage during the preparation of the coating composition be about 2–6. In certain embodiments, such as when maximum dispersion stability is desired, it is preferred that the pH at any stage during the preparation of the coating composition be about 3–5, more preferably about 3.5–4.5. The pH can be adjusted using any suitable method, such as via the addition of an acid (e.g., mineral acid, acidic cation exchange resin, etc.) or a base (e.g., an alkali metal hydroxide, basic anion exchange resin, etc.).

The coating composition can further comprise one or more other additives. Suitable additives can include, for example, cationic surfactants, anionic surfactants (e.g., long-chain alkylbenzene sulfonate salts and long-chain, preferably branched chain, alkylsulfosuccinate esters), nonionic surfactants (e.g., polyalkylene oxide ethers of long-chain, preferably branched-chain, alkyl group-containing phenols, polyalkylene oxide ethers of long-chain alkyl alcohols, and fluorinated surfactants), hardeners (e.g., active halogen compounds, vinylsulfone compounds, aziridine compounds, epoxy compounds, acryloyl compounds, isocyanate compounds, etc.), pigment dispersants, thickeners, flowability improvers, antifoamers (e.g., octyl alcohol, silicone-based antifoamers, etc.), foam inhibitors, releasing agents, foaming agents, penetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antifungal agents, yellowing inhibitors (e.g., sodium hydroxymethanesulfonate, sodium p-toluenesulfinate, etc.), ultraviolet absorbers (e.g., benzotriazole compounds having a hydroxy-dialkylphenyl group at the 2-position), antioxidants (e.g., sterically hindered phenol compounds), anti-static agents, pH regulators (e.g., sodium hydroxide, sodium carbonate, sulfuric acid, hydrochloric acid, phosphoric acid, citric acid, etc.), water-resisting agents, wet strengthening agents, and dry strengthening agents. In addition to these additives, the coating composition also can comprise a mordant. Suitable mordants include, for example, poly (ethyleneimine), poly(vinylbenzyl trimethylammonium chloride), poly(diallyldimethyl ammonium chloride), and mixtures thereof.

Additional particulates can be added to the coating composition, if desired, to further enhance the ability of the ink jet recording medium to immobilize colorants. Such particulates include, for example, calcium carbonate, clays, aluminum silicates, urea-formaldehydes, and the like. Other suitable particulates include alumina (e.g., alumina sols, colloidal alumina, cationic aluminum oxide or hydrates thereof, pseudoboehmite, etc.), magnesium silicate, magnesium carbonate, kaolin, talc, calcium sulfate, barium sulfate, titanium dioxide, zinc oxide, zinc sulfide, zinc carbonate, satin white, diatomaceous earth, calcium silicate, aluminum hydroxide, lithopone, zeolite, hydrated halloycite, magnesium hydroxide, polyolefins (e.g., polystyrene, polyethylene, polypropylene, etc.), plastics (e.g., acrylic), urea resin, and melamine resin.

The coating composition can be applied to the flexible substrate using any suitable method or combination of methods to provide the coated flexible substrate. Suitable methods include, but are not limited to, roll coating, blade coating, air knife coating, rod coating, bar coating, cast coating, gate roll coating, wire bar coating, short-dowel coating, slide hopper coating, curtain coating, flexographic coating, gravure coating, Komma coating, size press coating in the manner of on- or off-machine, and die coating, with rapid, relatively inexpensive methods such as rod coating and blade coating being preferred.

After application to the flexible substrate, the coating composition can be dried using any suitable method or combination of methods to provide the ink jet recording medium. Suitable drying methods include, but are not limited to, air or convection drying (e.g., linear tunnel drying, arch drying, air-loop drying, sine curve air float drying, etc.), contact or conduction drying, and radiant-energy drying (e.g., infrared drying and microwave drying).

An image can be recorded on the ink jet recording medium by any suitable method. Suitable methods include those known in the art such as drop on demand methods (e.g., piezo electric or thermal methods) and continuous methods. Preferably, the method comprises a system whereby ink is released from a nozzle and applied to the ink jet recording medium. The ink jet system disclosed in Japanese Patent Document No. 54-59936, in which an ink rapidly changes volume due to the action of thermal energy and is ejected from a nozzle by the action of this change of state, effectively can be used in conjunction with the ink jet recording medium of the invention.

The following example further illustrates the invention but, of course, should not be construed as in any way limiting its scope.

EXAMPLE

This example illustrates the preparation of an ink jet recording medium of the invention using a coating composition and methods of the invention.

A high shear mixer was charged with deionized water (93 kg) and hydrochloric acid (150 g of 37% concentration). With the mixer running, fumed silica (38.9 g of 200 m$^2$/g Cab-O-Sil® fumed silica available from Cabot Corporation) was added in sequential amounts and at a constant rate such that the mixture in the aqueous vehicle did not coagulate. After complete addition of the fumed silica, the mixture of fumed silica in the aqueous vehicle was further subjected to high shear mixing for an additional hour. Deionized water (57.4 kg) then was added to the mixer, and high shear mixing continued for an additional 10 minutes. While the mixer was running, N-(2-aminoethyl)-3-aminopropyltrimethoxysilane (221 g) was added to the mixer and subjected to high shear mixing for about 15 minutes so as to produce the dispersion of the product formed from the contact between the fumed silica particles and the aminoorganosiloxane N-(2-aminoethyl)-3-aminopropyltrimethoxysilane. The dispersion was subsequently filtered through a nominal 1 µm bag filter to remove any large particles remaining in the dispersion. The resulting filtrate had the following properties:

| | |
|---|---|
| pH | 4.1 |
| Solids Content (by weight) | 21 wt. % |
| Brookfield Viscosity (Spindle 5, 60 rpm) | 47 cp |
| Mean Particle Diameter | 139 nm |
| Zeta Potential | +36 mV |

A 100 g amount of this filtered dispersion was added to a solution of polyvinyl alcohol (11.1 g of 30% concentration Airvol 203, Air Products Inc.) and a 10% solution of a wetting agent (0.8 g Surfactant 10-G, Arch Chemicals, Inc.). This mixture was subjected to mixing for approximately one minute. The mixture then was placed in a vacuum desiccator at ambient temperature (about 20–25° C.) for about one hour to remove any entrained air bubbles. The resulting coating composition was coated onto transparent poly(ethylene terephthalate) polymer film using a Number 22 Meyer Rod applicator. The resulting coated substrate was dried at 35° C. for about three hours to produce an ink jet recording medium having a coating weight of 10–11 g/m$^2$.

The ink jet recording medium produced by the invention exhibited good gloss and absorption as well as a superior feel. Moreover, the ink jet recording medium provided printed images with excellent waterfastness, detailed sharpness, high resolution and a desirable color density when used in an ink jet printing process.

All of the references cited herein, including patents, patent applications, and publications, are hereby incorporated in their entireties by reference, While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims.

What is claimed is:

1. An ink jet recording medium comprising a flexible substrate and a coating composition coated on at least one surface of the substrate, wherein the coating composition comprises the product formed from the contact between fumed silica particles and at least one aminoorganosiloxane in an amount of about 0.05–3% by weight of the fumed silica.

2. The ink jet recording medium of claim 1, wherein the aminoorganosiloxane is of the formula $(R^1O)_nSi(R^2)_m$, wherein $R^1$ is H, a $C_1$–$C_{10}$ alkyl, or a metal ion; $R^2$ is an aryl, a $C_1$–$C_{10}$ alkyl, or an aralkyl, wherein the aryl, alkyl, and aralkyl are substituted with one or more substituents selected from the group consisting of amines and quaternary ammonium salts; and n and m are each integers equal to or greater than 1, wherein the sum of n and m is 4.

3. The ink jet recoding medium of claim 2, wherein n is 3 and m is 1.

4. The ink jet recording medium of claim 2, wherein $R^2$ is an alkyl substituted with one or more substituents selected from the group consisting of amines and quaternary ammonium salts.

5. The ink jet recording medium of claim 4, wherein the aminoorganosiloxane is of the formula:

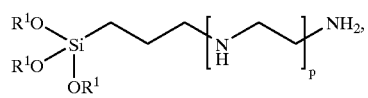

wherein p is an integer from zero to about 100.

6. The ink jet recording medium of claim 5, wherein p is an integer from zero to about 50.

7. The ink jet recording medium of claim 6, wherein p is either zero or 1.

8. The ink jet recording medium of claim 7, wherein $R^1$ is selected from the group consisting of H, methyl, or ethyl.

9. The ink jet recoding medium of claim 7, wherein $R^2$ is substituted with a polyamine.

10. The ink jet recording medium of claim 9, wherein the polyamine is poly(ethyleneimine) or derivatives thereof.

11. The ink jet recording medium of claim 7, wherein the aminoorganosiloxane is selected from the group consisting of 3-aminopropyltrimethoxysilane, N-(2-aminoethyl)-3-aminopropyltrimethoxysilane, (3-trimethoxysilylpropyl)-diethylenetriamine, 3-aminopropyltriethoxysilane, N-(2-aminoethyl)-3-aminopropyltriethoxysilane, (3-triethoxysilylpropyl)-diethylenetriamine, and mixtures thereof.

12. The ink jet recording medium of claim 1, wherein the flexible substrate comprises a polymer film, cellulose paper, or a photo-base material.

13. The ink jet recording medium of claim 12, wherein the flexible substrate comprises a polymer film selected from the group consisting of a poly(ethylene terephthalate) polymer, polyester, polyvinyl chloride, and mixtures thereof.

14. The ink jet recording medium of claim 12, wherein the substrate comprises a photo-base material coated with at least one coating selected from the group consisting of polyethylene, baryte, and derivatives thereof.

15. The ink jet recording medium of claim 1, wherein the fumed silica particles comprise aggregates of primary particles, and the aggregates have a mean diameter of about 100 nm–1 μm.

16. The ink jet recording medium of claim 15, wherein the fumed silica particles comprise aggregates of primary particles, and the aggregates have a mean diameter of about 100–500 nm.

17. The ink jet recording medium of claim 16, wherein the fumed silica particles comprise aggregates of primary particles, and the aggregates have a mean diameter of about 100–400 nm.

18. The ink jet recording medium of claim 17, wherein the fumed silica particles comprise aggregates of primary particles, and the aggregates have a mean diameter of about 150–250 nm.

19. The ink jet recording medium of claim 11, wherein the fumed silica particles comprise aggregates of primary particles, and the aggregates have a mean diameter of about 100–400 nm.

20. The ink jet recording medium of claim 19, wherein the fumed silica particles comprise aggregates of primary particles, and the aggregates have a mean diameter of about 150–250 nm.

21. The ink jet recording medium of claim 1, wherein the fumed silica particles comprise aggregates of primary particles, and the primary particles have a mean diameter of about 1–100 nm.

22. The ink jet recording medium of claim 21, wherein the fumed silica particles comprise aggregates of primary particles, and the primary particles have a mean diameter of about 1–50 nm.

23. The ink jet recording medium of claim 22, wherein the fumed silica particles comprise aggregates of primary particles, and the primary particles have a mean diameter of about 1–30 nm.

24. The ink jet recording medium of claim 23, wherein the fumed silica particles comprise aggregates of primary particles, and the primary particles have a mean diameter of about 5–15 nm.

25. The ink jet recording medium of claim 11, wherein the fumed silica particles comprise aggregates of primary particles, and the primary particles have a mean diameter of about 1–30 nm.

26. The ink jet recording medium of claim 25, wherein the fumed silica particles comprise aggregates of primary particles, and the primary particles have a mean diameter of about 5–15 nm.

27. The ink jet recording medium of claim 1, wherein the fumed silica particles are contacted with the at least one aminoorganosiloxane in an amount of about 1–3% by weight of the fumed silica.

28. The ink jet recording medium of claim 11, wherein the fumed silica particles are contacted with the at least one aminoorganosiloxane in an amount of about 1–3% by weight of the fumed silica.

* * * * *